(12) United States Patent
Lee et al.

(10) Patent No.: US 10,737,573 B2
(45) Date of Patent: Aug. 11, 2020

(54) INPUT DEVICE FOR VEHICLE

(71) Applicants: Hyundai Motor Company, Seoul (KR); Kia Motors Corporation, Seoul (KR); Duck Yang Industry Co., Ltd., Ulsan (KR)

(72) Inventors: Young Ju Lee, Suwon-si (KR); Hye Kyung Kim, Suwon-si (KR); Dae Ig Jung, Suwon-si (KR); Keon Soo Jin, Ulsan (KR); Dong Gi Lee, Ulsan (KR); Sang Ryool Ju, Busan (KR)

(73) Assignees: Hyundai Motor Company, Seoul (KR); Kia Motors Corporation, Seoul (KR); Duck Yang Industry Co., Ltd., Ulsan (KR)

( * ) Notice: Subject to any disclaimer, the term of this patent is extended or adjusted under 35 U.S.C. 154(b) by 389 days.

(21) Appl. No.: 15/620,485

(22) Filed: Jun. 12, 2017

(65) Prior Publication Data

US 2018/0164918 A1    Jun. 14, 2018

(30) Foreign Application Priority Data

Dec. 12, 2016  (KR) .......................... 10-2016-0168796

(51) Int. Cl.
  *G06F 3/045* (2006.01)
  *B60K 35/00* (2006.01)
  *B60Q 3/14* (2017.01)
  *B60K 37/06* (2006.01)
  *F21V 8/00* (2006.01)
  *F21W 107/00* (2018.01)

(52) U.S. Cl.
  CPC .............. *B60K 35/00* (2013.01); *B60K 37/06* (2013.01); *B60Q 3/14* (2017.02); *B60K 2370/143* (2019.05); *B60K 2370/152* (2019.05); *B60K 2370/34* (2019.05); *B60K 2370/774* (2019.05); *F21W 2107/00* (2018.01); *G02B 6/0011* (2013.01)

(58) Field of Classification Search
  CPC ........ B60K 2370/143; B60K 2370/152; B60K 2370/34; B60K 2370/774; B60K 35/00; B60K 37/06; B60Q 3/14; F21W 2107/00; G02B 6/0011
  See application file for complete search history.

(56) References Cited

U.S. PATENT DOCUMENTS

| | | | |
|---|---|---|---|
| 7,595,791 B2 | 9/2009 | Takata et al. | |
| 8,525,812 B2 | 9/2013 | Tanaami | |
| 2011/0134054 A1 | 6/2011 | Woo et al. | |
| 2014/0192001 A1* | 7/2014 | McKillop | G06F 3/03547 345/173 |

FOREIGN PATENT DOCUMENTS

| | | |
|---|---|---|
| JP | 2013-184300 A | 9/2013 |
| KR | 10-2005-0095233 A | 9/2005 |
| KR | 10-2008-0048630 A | 6/2008 |
| KR | 10-2011-0063218 A | 6/2011 |

* cited by examiner

*Primary Examiner* — Insa Sadio
(74) *Attorney, Agent, or Firm* — Morgan, Lewis & Bockius LLP

(57) ABSTRACT

An input device configured for a vehicle in which a display area and an input area are realized as a single body so that a degree of freedom of design may be improved, may include a body having a display area and an input area, and a touch assembly disposed under the input area, and one or more input elements and one or more indicators are formed in the input area.

10 Claims, 8 Drawing Sheets

INPUT DEVICE FOR VEHICLE

CROSS-REFERENCE TO RELATED APPLICATION

The present application claims priority to Korean Patent Application No. 10-2016-0168796, filed on Dec. 12, 2016, the entire contents of which is incorporated herein for all purposes by this reference.

BACKGROUND OF THE INVENTION

Field of the Invention

The present invention relates to an input device for a vehicle that is applied to a center fascia and the like, and more particularly to an input device for a vehicle in which a display area and an input area are realized as a single body so that a degree of freedom of design may be improved.

Description of Related Art

In general, various devices, such as an air conditioner, a heater, an audio, and a navigation device, that improve convenience of the driver or a passenger are installed in vehicles. An input device for manipulating, for example, the air conditioner, the heater, the audio, and the navigation device may be installed a center fascia, dashboard, or a console box of the vehicles.

The conventional input device for a vehicle has a plurality of push type knobs, and accordingly, the number of assembly components is large and thus an overall assembly structure is complex and the weight of the input device is considerable.

As a display that displays a driving condition, navigation information, and the like is provided in a center fascia or the like of the vehicle and the input device is provided independently from the display, a border line may be formed between the display and the input device.

In this way, according to the related art, the border line is formed between the input device and the display, a degree of freedom of design may be bad.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an input device for a vehicle in which a display area and an input area are formed in a single body so that a degree of freedom of design and an assembly efficiency of the input device may be improved.

In accordance with an aspect of the present invention, there is provided an input device for a vehicle including a body having a display area and an input area, and a touch assembly disposed under the input area, and one or more input elements and one or more indicators are formed in the input area.

The touch assembly may include a printed circuit board in which one or more touch sensors are disposed, and a lighting device disposed on the printed circuit board, and the touch sensors may be disposed at locations corresponding to the input elements.

The touch sensors may be capacitive touch sensors.

The lighting device may include a plurality of light emitting elements, and a support member configured to support the plurality of light emitting elements.

The support member may have one or more openings, and a first light emitting element and a second light emitting element may be individually disposed in the openings.

The first light emitting element may irradiate light towards the input elements, and the second light emitting element may irradiate light towards the indicators.

A first light guide plate and a second light guide plate may be individually disposed in the openings, and the first guide plate may guide light of the first light emitting device towards the input elements, and the second light guide plate may guide light of the second light emitting element towards the indicators.

A film may be disposed on the lighting device, and the film may have a plurality of translucent portions formed at locations corresponding to the input elements and the indicators.

The input elements and the indicators may be transfer-printed in the input area of the body through molding.

Half mirrors may be disposed on upper surfaces of the input elements and the indicators.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
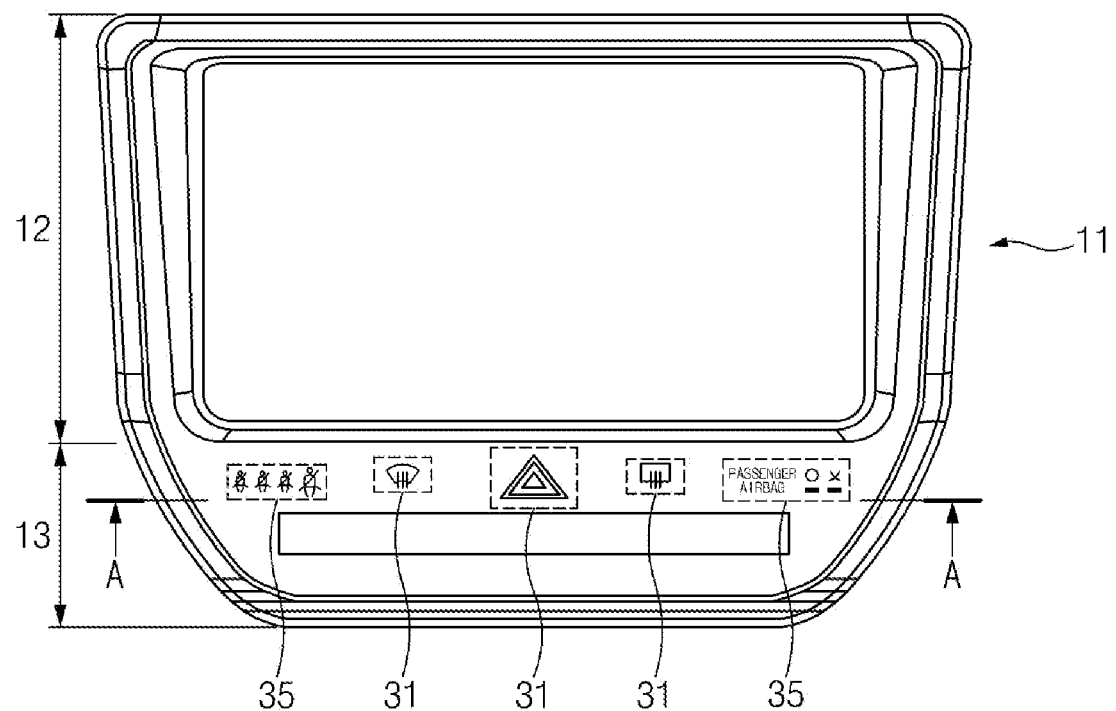
FIG. 1 is a front view illustrating an input device for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an input device for a vehicle according to an exemplary embodiment of the present invention may include a body 11 having a display area 12 and an input area 13, and a touch assembly 20 disposed under the input area 13.

The body 11 may be formed of a resin having a translucency, by which light may transmit the whole body 11.

The body 11 may have a display area 12 configured to display various information, and an input area 13 disposed on one side of the display area 12.

The display area 12 may be configured to display various information including a driving condition of a vehicle, a state of the vehicle, navigation information, audio information, and video information.

A display panel, a display driving module, and the like may be disposed under the display area 12.

Figure 2:
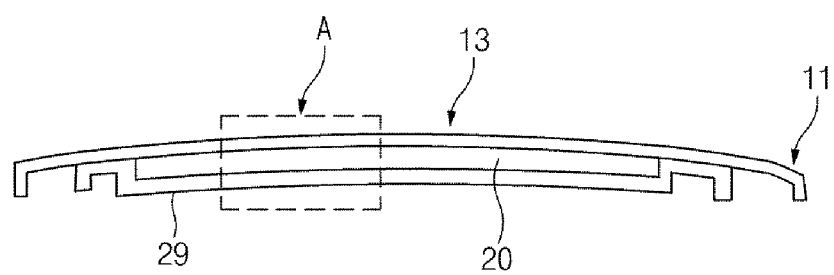
FIG. 2 is a sectional view taken along line A-A of FIG. 1.

As illustrated in FIG. 1 and FIG. 2, one or more input elements 31, to which a touch of a user is input, and one or more indicators 35 configured to display a condition of the vehicle and the like may be formed in the input area 13 of the body 11. The input elements 31 and the indicators 35 may be displayed with various symbols including letters, numbers, figures, and the like.

The input elements 31 and the indicators 35 may have translucent colors by which light from light emitting elements 23a and 23b of the touch assembly 20, which will be described below, may transmit the input elements 31 and the indicators 35. Base portions 32 may be formed around the input elements 31 and the indicators 35, and the base portions 32 may have a non-translucent color including black, by which light cannot transmit the base portions 32.

According to the exemplary embodiment of the present invention, a plurality of input elements 31 and a plurality of indicators 35 may be formed on the surface of the input area 13 of the body 11 through transfer printing by use of molding.

Referring to FIG. 2, the touch assembly 20 may be disposed under the input area 13 of the body 11, the touch assembly 20 may be supported by a cover 29, and the cover 29 may be detachably coupled to a lower surface of the body 11 by use of a coupling device.

Figure 3:
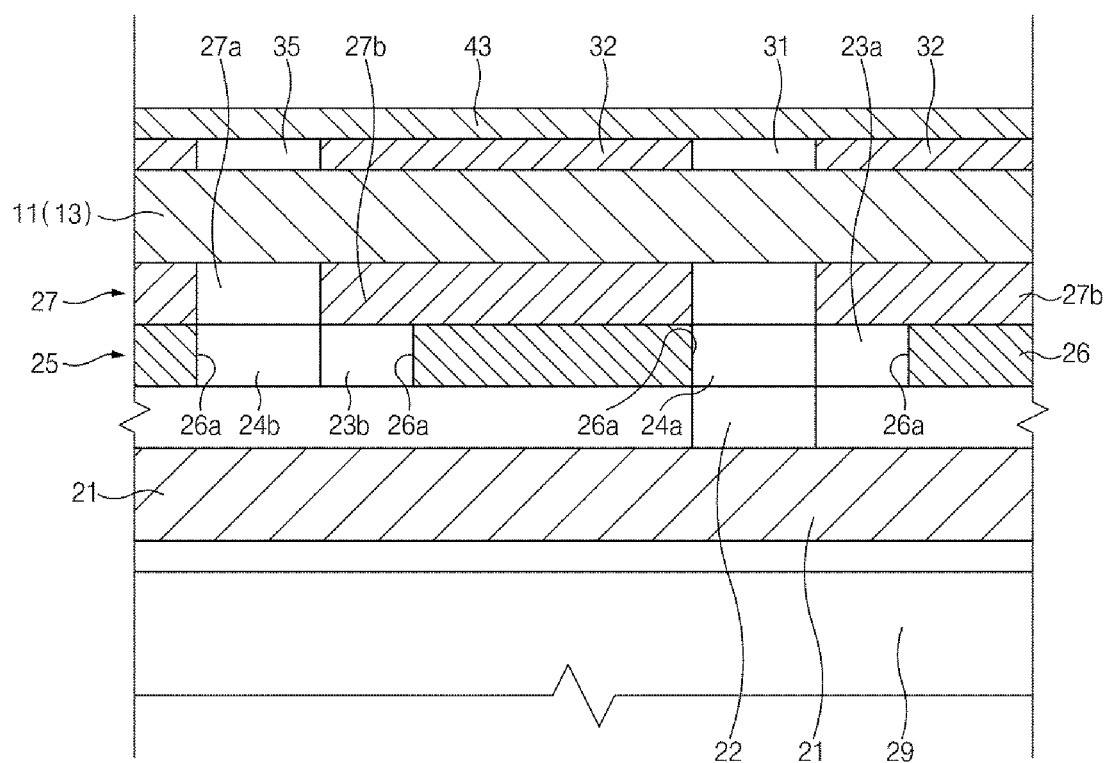
FIG. 3 is an enlarged view of a portion of arrow B of FIG. 2.

Referring to FIG. 3, the touch assembly 20 may include a printed circuit board 21, a lighting device 25 disposed on the printed circuit board 21, and a lower film 27 disposed on the lighting device 25.

A plurality of touch sensors 22 may be disposed on an upper surface of the printed circuit board 21, and the number of the plurality of touch sensors 22 may be the same as the number of the plurality of input elements 31. The plurality of touch sensors 22 may be disposed at locations corresponding to the plurality of input elements 31.

According to the exemplary embodiment of the present invention, the touch sensors 22 may be capacitive touch sensors configured to detect a change of capacitance by a touch of a user.

The light device 25 may include a plurality of light emitting elements 23a and 23b, and a support member 26 configured to support the plurality of light emitting elements 23a and 23b, and the support member 26 may have a plurality of openings 26a.

The number of the plurality of openings 26a may be the same as the number of the plurality of input elements 31 and the plurality of indicators 35. The plurality of openings 26a may be disposed at locations corresponding to the plurality of input elements 31 and the plurality of indicators 35.

The first light emitting elements 23a and the second light emitting elements 23b may be individually disposed in the plurality of openings 26a. The first light emitting elements 23a may be configured to irradiate light towards the input elements 31, and the second light emitting elements 23b may be configured to irradiate light towards the indicators 35.

According to the exemplary embodiment of the present invention, the light emitting elements 23a and 23b may be LEDs.

According to the exemplary embodiment of the present invention, a plurality of first light guide plates 24a and a plurality of second light guide plates 24b may be individually disposed in the plurality of openings 26a.

The first light guide plates 24a may be individually disposed on side surfaces of the first light emitting elements 23a to be adjacent to each other, and the first light guide plates 24a may be configured to individually guide light of the first light emitting elements 23a towards the input elements 31. According to an embodiment, the vertical axes of the first light guide plates 24a may be disposed to coincide with the vertical axes of the input elements 31.

The second light guide plates 24b may be individually disposed on side surfaces of the second light emitting elements 23b to be adjacent to each other, and the second light guide plates 24b may be configured to individually guide light of the second light emitting elements 23b towards the indicators 35. According to an embodiment, the vertical axes of the second light guide plates 24b may be disposed to coincide with the vertical axes of the indicators 35.

In this way, according to an exemplary embodiment of the present invention, because the locations of the light emitting elements 23a and 23b and the light guide plates 24a and 24b may be fixedly maintained and the adjacent light emitting elements 23a and 23b may be separated from each other by individually accommodating the light emitting elements 23a and 23b and the light guide plates 24a and 24b in the openings 25a of the support member 25, the light irradiated from the adjacent light emitting elements 23a and 23b may be effectively prevented from interfering with each other.

The lower film 27 may have a plurality of translucent portions 27a at locations corresponding to the plurality of input elements 31 and the plurality of indicators 35.

Non-translucent portions 27b may be formed around and between the translucent portions 27a, and the non-translucent portions 27b may correspond to the base portions 32 formed around and between the input elements 31.

According to the exemplary embodiment of the present invention, the plurality of translucent portions 27b may have a diffusion structure by which light transmitted from the light emitting elements 23 may be diffused towards the input elements 31. Like the base portions 32, the non-translucent portions 27b may have a black color.

Figure 4:
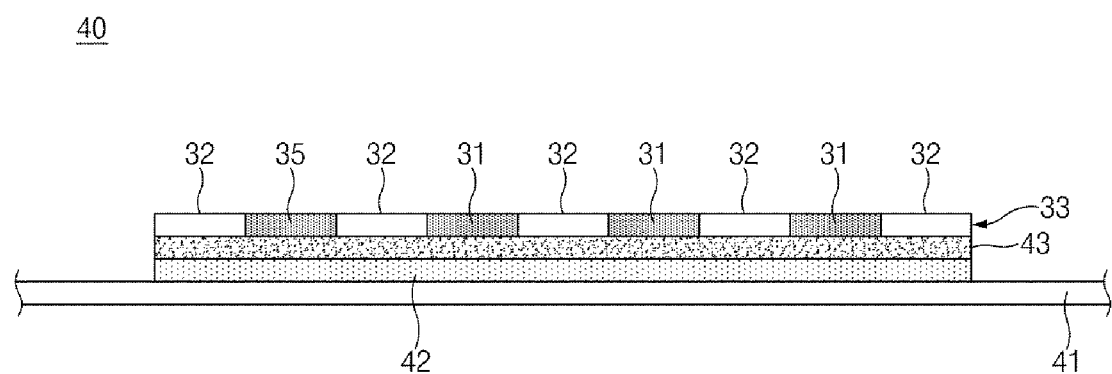
FIG. 4 is a view illustrating a state in which an input element and an indicator of the input device for a vehicle are formed on a surface of a film according to an exemplary embodiment of the present invention.
Figure 5:
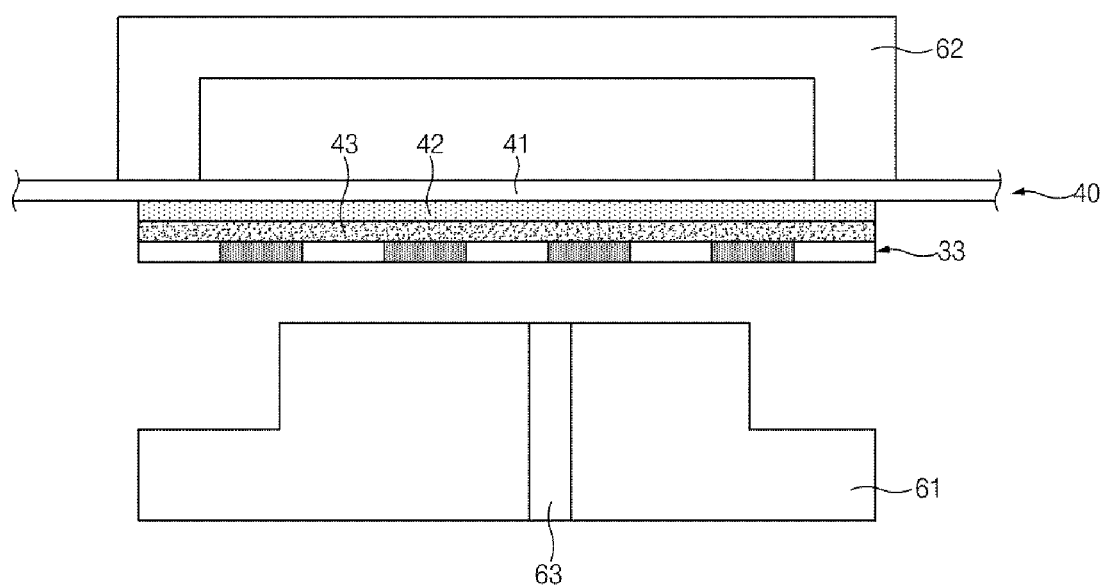
FIG. 5 is a view illustrating an operation of forming the input element and the indicator of the input device for a vehicle in an input area of a body according to an exemplary embodiment of the present invention.
Figure 6:
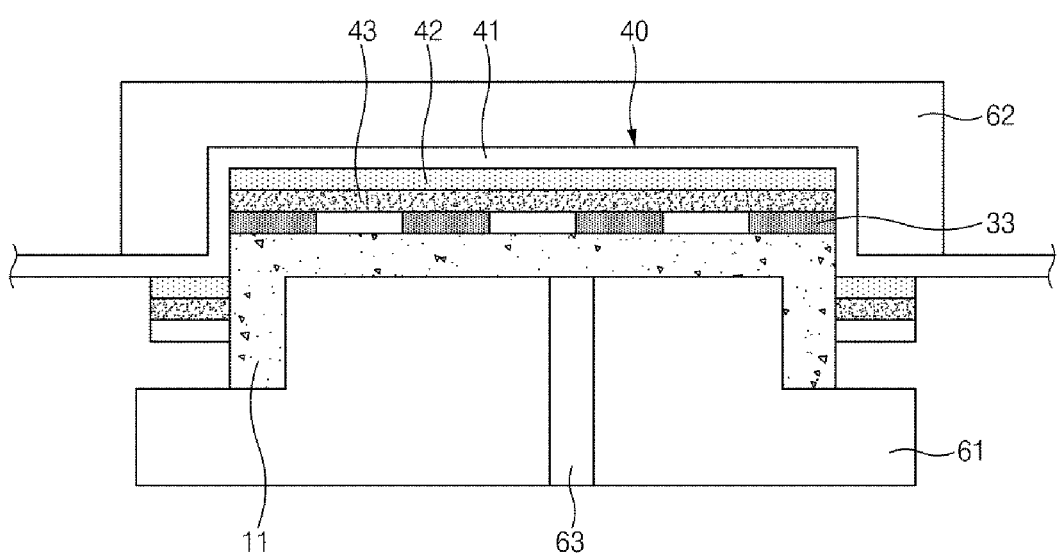
FIG. 6 is a view illustrating an operation of forming the input element and the indicator of the input device for a vehicle in an input area of a body according to an exemplary embodiment of the present invention.
Figure 7:
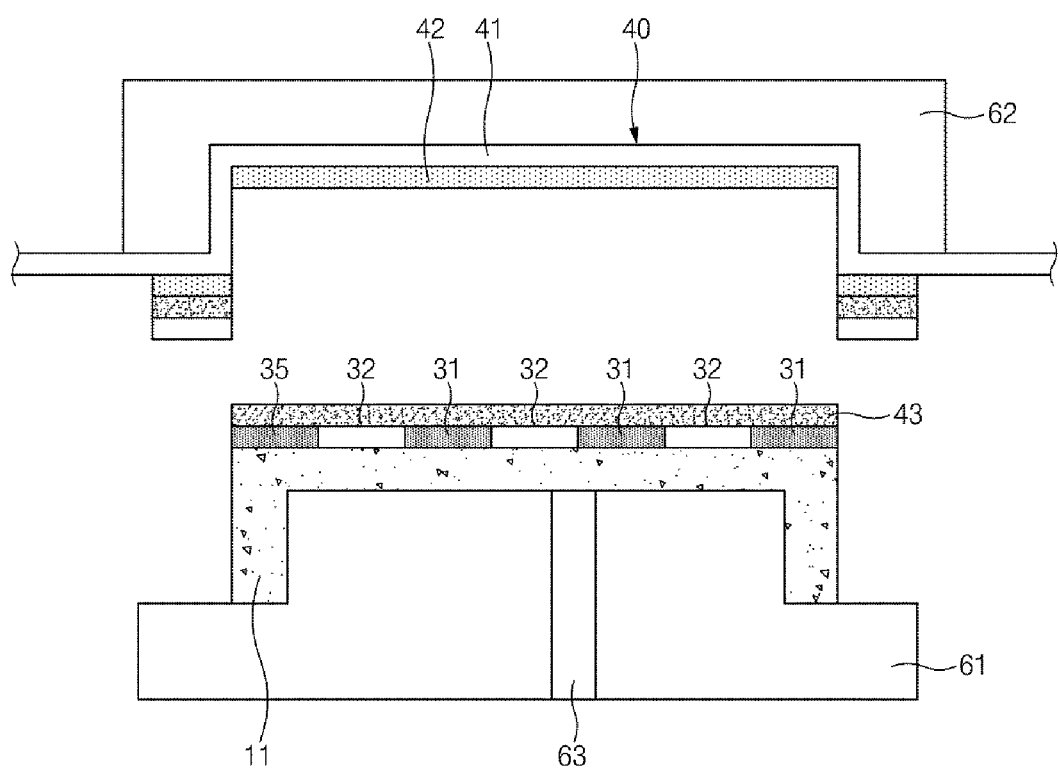
FIG. 7 is a view illustrating an operation of forming the input element and the indicator of the input device for a vehicle in an input area of a body according to an exemplary embodiment of the present invention.

FIG. 4, FIG. 5, FIG. 6, and FIG. 7 illustrate a process of integrally formed to a plurality of input elements 31 and a plurality of indicators 35 on a surface of an input area 13 of a body 11 through molding, as a sequential molding process of FIG. 4, FIG. 5 and FIG. 7.

As illustrated in FIG. 4, the plurality of input elements 31 and the plurality of indicators 35 may be formed on a surface of a film 41. A film assembly 40 is manufactured by forming a release layer 42 on a surface of the film 41, depositing a half mirror 43 on a surface of the release layer 42, and forming an upper film 33 as a display layer having a plurality of input elements 31, a plurality of indicators 35, and base portions 32 on a surface of the half mirror 43.

As illustrated in FIG. 5, FIG. 6 and FIG. 7, a cavity 64 may be formed by a first mold 61 and a second mold 62, and the first mold 61 has a resin flow path 63, along which a resin is injected.

As illustrated in FIG. 5, the film assembly 40 of FIG. 4 is interposed between the first mold 61 and the second mold 62.

As illustrated in FIG. 6, after the first mold 61 and the second mold 62 are closed, the body 11 may be formed in the cavity 63 by injecting a molten resin into the cavity 64 through the resin flow path of the first mold 61, and the upper film 33 and the half mirror 43 of the film assembly 40 may be attached to an upper surface of the body 11.

Next, after the first mold 61 and the second mold 62 are opened, the half mirror 43 and the upper film 33 may remain attached to the surface of the body 11 due to the release layer 42 of the film assembly 40, and the film 41 and the release layer 42 of the film assembly 40 may be released from the body 11.

Through molding, the input elements and the indicators 35 may be formed on upper surface of the input area 13 of the body 11 as a single body through transfer printing.

Further, according to an exemplary embodiment of the present invention, the half mirror 43 is formed on the up surface of the upper film 33 as a single body through molding, the input elements 31 and the indicators 35 may be hidden when electric power is not supplied to the first and second light emitting elements 23a and 23b.

Figure 8:
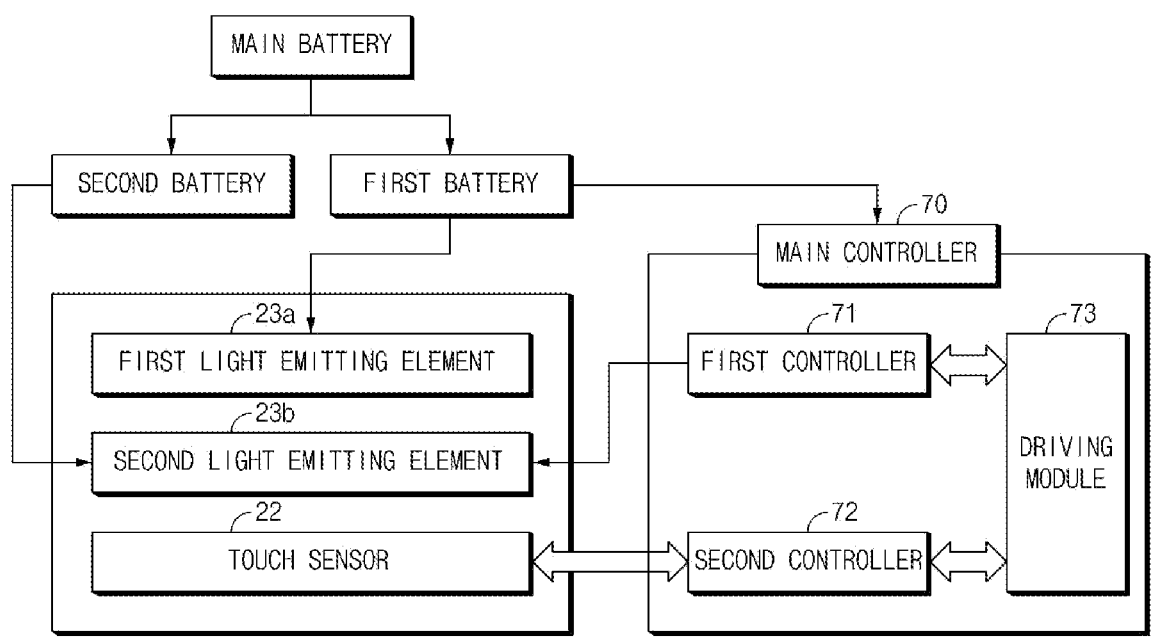
FIG. 8 is a block diagram illustrating control of the input device for a vehicle according to the exemplary embodiment of the present invention.

FIG. 8 is a block diagram illustrating control of an input device according to the exemplary embodiment of the present invention.

Referring to FIG. 8, the input device according to the exemplary embodiment of the present invention may further include a main control device 70, to which the second light emitting elements 23b and the touch sensor 22 are connected.

The main control device 70 may include a first controller 71 connected to the second light emitting element 23b, a second controller 72 connected to the touch sensor, and a driving module 73 connected to the first and second controllers 71.

The first controller is configured to control the second light emitting elements 23b such that the second light emitting elements 23b are turned on or off, and the second controller 72 is configured to receive a touch input for the touch sensor 22 and generate various control signals.

The driving module 73 may have an algorithm for analyzing a touch signal for the touch sensor 22, and an algorithm for controlling turning on or off of the second light emitting elements 23b.

The main control device 70 may receive electric power from a main battery 80, and a first battery 81 and a second battery 82 may be connected to the main battery 80 in parallel to each other. The first battery 81 may be configured to supply electric power to the first light emitting elements 23a and the main control device 70, and the second battery 82 may be configured to supply electric power to the second light emitting elements 23b.

The first light emitting elements 23a may remain turned on when the first battery 81 supplies electric power to the first light emitting elements 23a.

The input device for a vehicle according to the exemplary embodiment of the present invention may improve a degree of freedom of design and an assembly efficiency as an input structure of a touch manner is realized and the display area and the input area are formed as a single body as well.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An input device for a vehicle, the input device comprising:
   a body; and
   a touch assembly disposed under the body,
   a display layer attached on an upper surface of the body, the display layer having one or more input elements, one or more indicators, and base portions formed around the one or more input elements and the one or more indicators; and
   a half mirror attached on an upper surface of the display layer,
   wherein the touch assembly includes a film attached to a lower surface of the body, and a lighting device attached to a lower surface of the film,
   wherein the film has a plurality of translucent portions and a plurality of non-translucent portions,
   wherein the plurality of translucent portions is aligned with the one or more input elements and the one or more indicators, and
   wherein the half mirror totally covers the one or more input elements, the one or more indicators, and the base portions.

2. The input device of claim 1, wherein the touch assembly further includes:
   a printed circuit board in which one or more touch sensors are disposed,
   wherein the touch sensors are aligned the one or more input elements.

3. The input device of claim 2, wherein the touch sensors are capacitive touch sensors.

4. The input device of claim 2, wherein the lighting device includes:

a plurality of light emitting elements; and a support member configured to support the plurality of light emitting elements.

5. The input device of claim 4, wherein the support member has one or more openings, and wherein the plurality of light emitting elements includes a first light emitting element and a second light emitting element that are respectively disposed in corresponding opening.

6. The input device of claim 5, wherein the first light emitting element is configured to irradiate light towards the one or more input elements, and the second light emitting element is configured to irradiate light towards the one or more indicators.

7. The input device of claim 6, wherein a first light guide plate and a second light guide plate are respectively disposed in the openings, and wherein the first guide plate is configured to guide light of the first light emitting device towards the one or more input elements, and the second light guide plate is configured to guide light of the second light emitting element towards the one or more indicators.

8. The input device of claim 1, wherein a base portion is formed on the body and the one or more input elements and the one or more indicators are formed in the base portion.

9. The input device of claim 1, wherein a cover is detachably mounted on a lower portion of the touch assembly.

10. The input device of claim 1, wherein the one or more input elements and the one or more indicators are transfer-printed in the input area of the body through molding.

* * * * *